D. Roberge,
Horseshoe.
No. 100,328.　　　　Patented Mar. 1, 1870
Fig. 2.
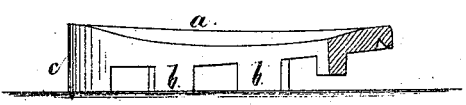
Fig. 1.　　　　　　Fig. 3.
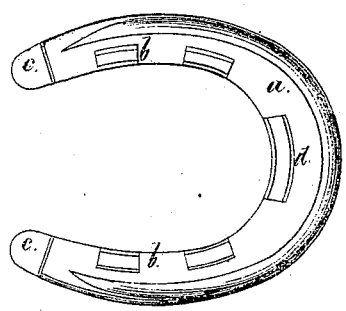　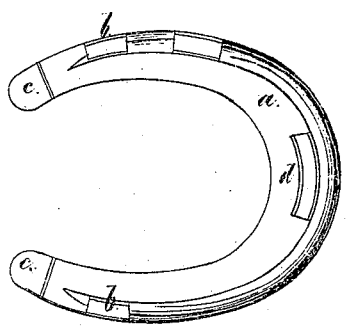
Witnesses:
Chas H Smith,
Harold Serrell.
D Roberge

United States Patent Office.

DAVID ROBERGE, OF MOOERS FORKS, NEW YORK.

Letters Patent No. 100,328, dated March 1, 1870.

IMPROVEMENT IN HORSESHOES.

The Schedule referred to in these Letters Patent and making part of the same.

*To all whom it may concern:*

Be it known that I, DAVID ROBERGE, of Mooers Forks, in the county of Clinton, and State of New York, have invented and made a new and useful Improvement in Horseshoes; and I do hereby declare the following to be a full, clear, and exact description of the said invention, reference being had to the annexed drawing making part of this specification, wherein—

Figure 1 is an inverted plan of the said horseshoe;
Figure 2 is a longitudinal section of the same; and
Figure 3 is an inverted plan of the shoe, with a slight modification in the position of the calks.

Similar marks of reference denote the same parts.

The shoes of horses have heretofore been made either of a uniform, or nearly uniform thickness, or else the upper surface of the shoe has been flat.

In Letters Patent granted to me May 25, 1869, a horseshoe is shown, in which a central bearing is provided for the weight of the horse, and the shoe is so shaped that it may have a rolling motion in any direction, in order that the animal's legs may not be strained by the flat shoe standing upon a flat surface, and keeping the joints, tendons, and muscles in an uncomfortable position.

My present invention has for its object the relief of horses from the risk of strain or injury, while, under ordinary circumstances, causing them to travel with greater ease, preventing strain, and rectifying any tendency for the horse's hoofs to interfere in cases where that tendency may exist.

My invention consists in a shoe formed with a concave upper surface between the toe and heel portions, and thickest at the heel, so as to raise the back portion of the hoof, give a transverse central bearing of the under side of the shoe, and cause the shoe to rock, and the hoof to move easily as the animal steps, the shoe rocking forward, relieving the joints, tendons, and muscles from undue strain and leverage.

In the drawing—

*a* represents the shoe, the upper surface of which is concave, or bent so that the hoof requires to be pared away toward the front portion, to correspond in shape with the shoe.

The shoe, instead of being of uniform thickness is made considerably thicker at the back than toward the front, as shown in fig. 2.

The side calks *b* are applied either at or near the inner edge of the shoe, as seen in fig. 1, or at or near the outer edge, as in fig. 3.

The heel calks *c c* may be slightly shorter than the side calks *b*, and a toe calk may be used, set near the inner or outer edge, as at *d*, and this toe calk is not as long as the side calks *b b*.

It will now be understood that the shoe has a central transverse bearing below the joint of the hoof, and will rock forward with the motion of the animal's foot, and tend to make the movement of the limbs regular and graceful, and in cases where there is a tendency in the animal's foot or leg to move incorrectly or to interfere, one of the side calks can be left off, as illustrated in fig. 3, so that the forward rolling will not be directly in the line of the horse's motion, but slightly diagonally thereto.

By the use of shoes of this kind, the animal's foot is set up at the heel, and has an easy position, corresponding to that which it would have if the hoof was allowed to wear away by use without shoes; hence the horse is kept in proper position, there being no undue strain on any of the parts.

The use of two calks on each side of the shoe increases the extent of wearing surface, and gives the shoe a better hold upon the pavement or other surface traveled over.

This shoe is especially adapted to sound horses. It may, however, be used with advantage in horses that are weak in the hoof-joints, because the movement is much more easy to the animal than with the ordinary shoe.

Where the hoof cannot be pared away for the shoe to be bent as much as represented, the calks can be made of a length to give the same bearing surface, as represented, and cause the shoe to rock as aforesaid.

What I claim, and desire to secure by Letters Patent, is—

The shoe, having a concave or bent upper surface, and made thicker at the heel portion than at the toe, so as to give a central transverse bearing, and allow the shoe to rock forward with the movement of the animal's foot, substantially as specified.

In witness whereof I have hereunto set my signature this 21st day of August, A. D. 1869.

D. ROBERGE.

Witnesses:
CHAS. H. SMITH,
HAROLD SERRELL.